(12) United States Patent
DeLay

(10) Patent No.: US 7,867,589 B2
(45) Date of Patent: Jan. 11, 2011

(54) HYBRID CRYOGENIC TANK CONSTRUCTION AND METHOD OF MANUFACTURE THEREFOR

(75) Inventor: Thomas K. DeLay, Huntsville, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 817 days.

(21) Appl. No.: 11/780,561

(22) Filed: Jul. 20, 2007

(65) Prior Publication Data

US 2009/0020536 A1 Jan. 22, 2009

(51) Int. Cl.
*B29D 22/00* (2006.01)
*B29D 23/00* (2006.01)
*B32B 1/08* (2006.01)

(52) U.S. Cl. .................. 428/36.91; 428/36.9; 428/35.7; 428/36.1; 428/36.4; 220/560.04

(58) Field of Classification Search ................ 428/36.9, 428/36.91, 35.7, 36.1, 36.3, 36.4; 220/560.04
See application file for complete search history.

(56) References Cited

U.S. PATENT DOCUMENTS

| | | | |
|---|---|---|---|
| 3,221,916 A | 12/1965 | Rysgaard | |
| 3,335,903 A | 8/1967 | Anderson | |
| 3,765,557 A | 10/1973 | Giwer | |
| 4,101,045 A | 7/1978 | Roberts et al. | |
| 4,462,214 A | 7/1984 | Ito | |
| 4,537,328 A | 8/1985 | Keesee et al. | |
| 4,699,288 A * | 10/1987 | Mohan | 220/590 |
| 5,150,812 A | 9/1992 | Adams | |
| 5,419,139 A | 5/1995 | Blum et al. | |
| 6,190,481 B1 * | 2/2001 | Iida et al. | 156/175 |
| 6,634,519 B2 | 10/2003 | Pelloux-Gervais et al. | |
| 6,837,464 B1 | 1/2005 | Kirn et al. | |
| 2002/0137871 A1 | 9/2002 | Wheeler, Jr. et al. | |
| 2004/0060304 A1 | 4/2004 | Aceves et al. | |
| 2005/0001100 A1 | 1/2005 | Hsi-Wu et al. | |
| 2005/0136239 A1 | 6/2005 | Eichinger et al. | |
| 2006/0054628 A1 | 3/2006 | Matsuoka et al. | |

* cited by examiner

*Primary Examiner*—Michael C Miggins
(74) *Attorney, Agent, or Firm*—Ross F. Hunt, Jr.; Douglas E. Jackson; James J. McGroary

(57) ABSTRACT

A lightweight, high-pressure cryogenic tank construction includes an inner layer comprising a matrix of fiber and resin suitable for cryogenic use. An outer layer in intimate contact with the inner layer provides support of the inner layer, and is made of resin composite. The tank is made by placing a fiber preform on a mandrel and infusing the preform with the resin. The infused preform is then encapsulated within the outer layer.

14 Claims, 1 Drawing Sheet

HYBRID CRYOGENIC TANK CONSTRUCTION AND METHOD OF MANUFACTURE THEREFOR

ORIGIN OF THE INVENTION

This invention was made by an employee of the United States Government and may be manufactured and used by or for the Government for governmental purposes without the payment of any royalties.

FIELD OF THE INVENTION

The present invention relates to tanks for holding cryogenic fluids and methods for making such tanks.

BACKGROUND OF THE INVENTION

Many prior art cryogenic tanks use tank materials that, on the positive side, are readily commercially available but, on the negative side, are not specifically designed for use in cryogenic conditions. Further, it has been assumed that, for space launch vehicle applications, the material would be capable of meeting the requirements attendant space vehicle launch and space travel. These requirements include a high temperature rating to combat aero-thermal heating, the ability to handle vibrational and launch loads, and the ability to completely confine cryogenic fluids without cracking of the tank and leaking of the fluid.

There are a relatively large number of patents relating to cryogenic tanks of various constructions. In one typical construction, an inner liner, usually made of metal, is covered with an overwrap of a matrix of an epoxy resin and carbon fibers. In general, the most significant component with respect to cost and schedule considerations in producing larger size tanks or vessels of this type is the introduction of the traditional metallic liner. In this regard, larger metallic tank liners require significant tool set-up and the weld joints required for the liners are troublesome sites for leakage.

SUMMARY OF THE INVENTION

In accordance with the invention, a pressure tank construction and method of manufacture are provided which uses a composite liner, and thus eliminate the need for the metal liner associated with typical composite over-wrapped vessels. This feature results in substantial weight savings and, moreover, the method of manufacture is easily scalable to much larger vessels and can be readily adapted to tooling charges. The technology is also readily adaptable to material changes based on the environment of a particular application.

In accordance with one aspect of the invention, there is provided a method of making a cryogenic tank for containing a cryogenic fluid, the method comprising constructing an inner layer comprised of a matrix of fiber and resin suitable for cryogenic use by placing a fiber preform on a removable mandrel including end fittings and infusing the preform with a resin having high ductibility at low temperatures, encapsulating the inner layer with a filament wound outer layer of a fiber-resin composite, in intimate contact with the inner layer, that performs well at low temperatures, providing for curing of the inner layer and the outer layer; and removing the mandrel.

Preferably the infusing of the preform comprises a vacuum assisted resin transfer molding operation.

In one preferred embodiment, the matrix of the inner layer comprises a polyurethane resin matrix.

In another preferred embodiment, the resin of the outer layer comprises an epoxy resin with high ductibility at low temperatures.

In one preferred implementation, the inner layer and outer layer are cured during overlapping time periods.

In an advantageous embodiment, the outer layer comprises a continuous tow of carbon fiber.

Preferably, the inner and outer layers include at least one of (i) different fibers, and (ii) different resins. In one embodiment, the inner and outer layers include different fibers. In another embodiment, the inner and outer layers comprise different fibers and different resins.

In accordance with a further aspect of the invention, there is provided a lightweight, high-pressure cryogenic tank construction, comprising:

an inner layer comprising a matrix of fiber and resin suitable for cryogenic use; and an outer layer in intimate contact with the inner layer and providing support of the inner layer, the outer layer comprising a fiber and resin composite.

Preferably, the fiber of the inner layer and the fiber of the outer layer are comprised of different materials.

Preferably, the resin of the inner layer and the resin of the outer layer are different resins.

In one preferred embodiment, the fiber of the inner layer comprises an aramid. In an alternative preferred embodiment, the fiber of the inner layer comprises a carbon fiber.

In another preferred embodiment, the inner layer comprises braided fiber, and the outer layer comprises a continuous filament wound layer.

In another preferred embodiment, the inner layer comprises a filament wound layer.

In an important implementation, the fiber of the inner layer comprises an aramid fiber and said resin of the inner layer comprises a polyurethane resin.

In an advantageous embodiment, fiber of the outer layer comprises a carbon fiber.

In another advantageous embodiment, the resin of the outer layer comprises a polyurethane resin. In an alternative advantageous embodiment, the resin of the outer layer comprises an epoxy resin.

In yet another preferred embodiment, the inner layer comprises phenylenebenzobisoxazole in a polyurethane matrix. In a complementary preferred embodiment, the outer layer comprises carbon fibers and a high elongation epoxy resin suitable for cryogenic temperatures.

Further features and advantages of the present invention will be set forth in, or apparent from, the detailed description of preferred embodiments thereof which follows.

DESCRIPTION OF THE PREFERRED EMBODIMENTS

Figure 1:
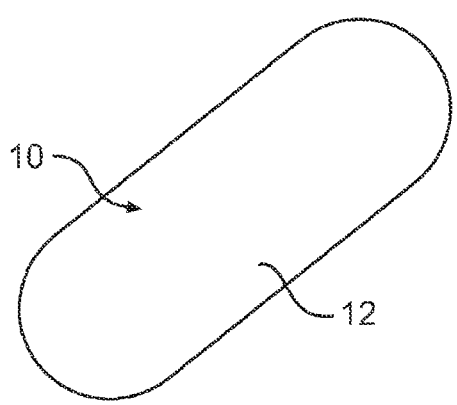
FIG. 1 is a perspective view of one embodiment of a pressure vessel.
Figure 2:
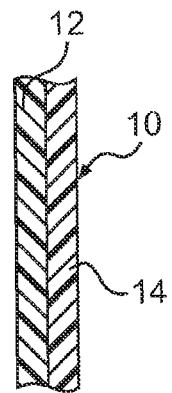
FIG. 2 is a schematic cross section of a vessel wall of the pressure vessel of FIG. 1 as constructed in accordance with a preferred embodiment of the invention.

Referring to FIG. 1, there is shown a pressure vessel or tank, which is generally denoted 10, including an outer layer 12. As shown in FIG. 2, vessel 10 also includes an inner layer 14 in intimate contact with outer layer 12. It will, of course, be understood that the pressure vessel 10 may be of other shapes and forms than that illustrated in FIG. 1. It will also be appreciated that FIG. 2 is not to scale and thus that, for example, the relative thicknesses shown for the two layers are not necessarily those of an actual pressure vessel.

It is noted that, in accordance with one important aspect of the invention, outer layer 12 is not a metallic layer or liner such as is found in typical prior art cryogenic pressure vessels. A further aspect of the invention concerns the compositions of layers 12 and 14 and these compositions are discussed below in connection with another aspect of the invention, viz., the methods of making the vessel of FIGS. 1 and 2.

Figure 3:
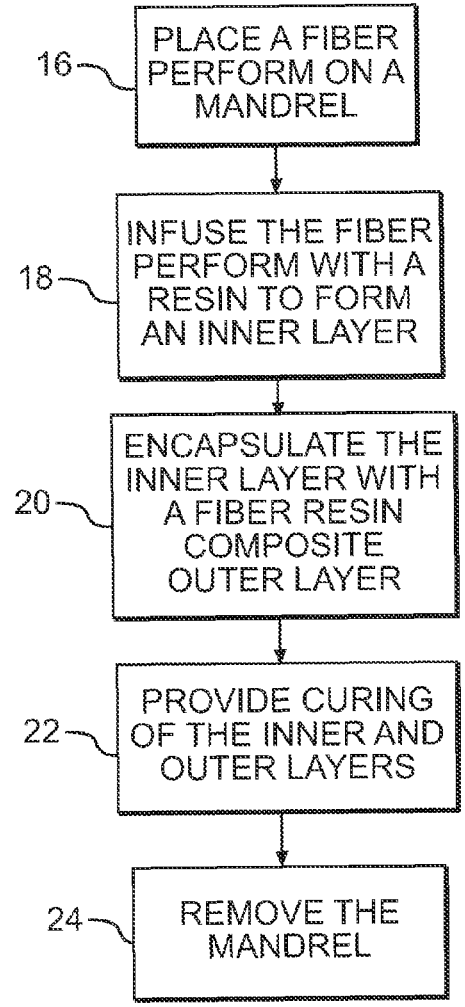
FIG. 3 is a flow chart of a method for making a pressure vessel in accordance with one preferred embodiment of the invention.

Referring to FIG. 3, there is shown a flow chart of one preferred embodiment of the method of the invention. As shown by block 16, in a first step, a fiber preform is placed on a conventional removable mandrel which is typically outfitted with metallic end fittings. Preferably, the fiber preform comprises a braided sleeve and/or a filament wound layer. In one preferred embodiment, the fiber is an aramid fiber but other embodiments are discussed below.

In the next stage, indicated by block 18, the preform is infused with a resin to form what serves the inner layer of the vessel and corresponds to layer 14 of FIG. 2. This infusing of the preform with a resin is preferably carried out using conventional vacuum assisted resin transfer molding. In one preferred embodiment, the resin is a polyurethane resin with high ductibility at low temperatures although other embodiments are discussed below. In one preferred embodiment, the resin is allowed to cure at this stage.

As shown by block 20, in a further step, the inner layer is encapsulated with a fiber-resin composite outer layer so that the inner and outer layers are in intimate contact. The outer layer corresponds to layer 14 of FIGS. 1 and 2. In an alternative preferred embodiment to that mentioned above, as indicated by block 22, the inner and outer layers can be cured or allowed to cure at the same time or during an overlapping time period.

After both layers are cured, the mandrel is removed, as indicated by block 24, and the vessel is ready for whatever final finishing or other processing that might be needed.

Preferably, the outer layer 12 is made of a material that performs well for cryogenic and other low temperature vessels. Because of the presence of inner layer 14, the outer layer 12 is not required to contain the fluids in the vessel, i.e., it is the inner layer 14 that acts as a liner to contain the fluids. The outer layer 12 can be made of a variety of materials including those mentioned above but, in another preferred embodiment, the fiber therein comprises a continuous tow of carbon fiber (e.g., T-1000™ carbon fiber or the like)or another high-strength fiber such as an aramid fiber as discussed above. The resin of outer layer 12 is preferably a high ductibility epoxy resin or a polyurethane matrix that performs well at low temperature. It will be appreciated that after the outer layer is allowed to cure, the mandrel can be removed as indicated above.

It will be understood that as a result of the use here of a hybrid construction comprising at least two reinforced material composites, a superior light-weight composite vessel results. The construction can be viewed as a hybrid if the inner layer 14 and outer layer 12 employ a different reinforcement fiber, a different resin or both.

In one preferred embodiment that has proved to be particularly effective on tanks cycled at high pressures with liquid nitrogen and liquid hydrogen, the inner layer 14 comprises PBO (phenylenebenzobisoxazole) within a polyurethane matrix and the outer layer 12 comprises carbon fibers (e.g., T-1000™ carbon fibers) within a high elongation epoxy resin matrix suitable for cryogenic temperatures. In another preferred embodiment, a polyurethane matrix is used for the outer layer 14 as well as the inner layer 12.

In the embodiments discussed above, the particular materials used provide important advantages. The fiber and resin of the inner layer 12 have a high strain-to-failure relationship at cryogenic temperatures and will not crack and produce leaks. On the other hand, the outer layer 14 serves more as a high performance structural support unit for the inner layer 12 than as a container. Thus, the outer layer 14 can be constructed of materials that are more suited for harsh external environments than the materials used for the inner layer 12.

Although the invention has been described above in relation to preferred embodiments thereof, it will be understood by those skilled in the art that variations and modifications can be effected in these preferred embodiments without departing from the scope and spirit of the invention.

What is claimed:

1. A lightweight, high-pressure cryogenic tank, comprising:
   an inner layer comprising a matrix of fiber and a polyurethane resin, the inner layer being suitable for cryogenic use and for containing a cryogenic fluid; and
   an outer layer which encapsulates the inner layer and which is in intimate layer-to-layer contact with the encapsulated inner layer, the outer layer providing structural support of said encapsulated inner layer, said outer layer comprising a fiber and resin composite.

2. A tank construction as claimed in claim 1 wherein the fiber of the inner layer and the fiber of the outer layer are comprised of different materials.

3. A tank construction as claimed in claim 1 wherein the resin of the inner layer and the resin of the outer layer are different resins.

4. A tank construction as claimed in claim 1 wherein the fiber of the inner layer comprises an aramid.

5. A tank construction as claimed in claim 1 wherein the fiber of the inner layer comprises a carbon fiber.

6. A tank construction as claimed in claim 1 wherein the inner layer comprises a filament wound layer.

7. A tank construction as claimed in claim 1 wherein the fiber of the inner layer comprises an aramid fiber.

8. A tank construction as claimed in claim 1 wherein the fiber of the outer layer comprises a carbon fiber.

9. A tank construction as claimed in claim 1 wherein the resin of the outer layer comprises a polyurethane resin.

10. A tank construction as claimed in claim 1 wherein the resin of the outer layer comprises an epoxy resin.

11. A tank construction as claimed in claim 1 wherein at least one of said layers comprises braided aramid fiber.

12. A tank construction as claimed in claim 11, wherein the outer layer comprises a continuous filament wound layer.

13. A tank construction as claimed in claim 1 wherein the inner layer comprises phenylenebenzobisoxazole in a polyurethane matrix.

14. A tank construction as claimed in claim 13 wherein the outer layer comprises carbon fibers between a high elongation epoxy resin suitable for cryogenic temperatures.

* * * * *